(12) United States Patent
Ibrahim et al.

(10) Patent No.: US 8,393,004 B2
(45) Date of Patent: Mar. 5, 2013

(54) SYSTEMS AND METHODS FOR PROTECTING INFORMATION USED BY MOBILE DEVICES

(75) Inventors: Wael M. Ibrahim, Cypress, TX (US); Mark Erby Taylor, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 219 days.

(21) Appl. No.: 12/864,720

(22) PCT Filed: Jan. 31, 2008

(86) PCT No.: PCT/US2008/052646
§ 371 (c)(1),
(2), (4) Date: Jul. 27, 2010

(87) PCT Pub. No.: WO2009/096976
PCT Pub. Date: Aug. 6, 2009

(65) Prior Publication Data
US 2010/0313275 A1    Dec. 9, 2010

(51) Int. Cl.
*G06F 21/00* (2006.01)
(52) U.S. Cl. .......... 726/26; 455/41.2; 713/189
(58) Field of Classification Search ............. None
See application file for complete search history.

(56) References Cited

U.S. PATENT DOCUMENTS

| 6,741,851 | B1 | 5/2004 | Lee et al. |
| 7,336,483 | B2 * | 2/2008 | Wang ..................... 361/679.33 |
| 2007/0239615 | A1 * | 10/2007 | Matsuzaki et al. ............. 705/55 |
| 2007/0249322 | A1 | 10/2007 | Benco et al. |

FOREIGN PATENT DOCUMENTS

KR    10-2003-0001725    1/2003

OTHER PUBLICATIONS

International Searching Authority, International Search Report and The Written Opinion, 9 pages, Oct. 2008.

* cited by examiner

*Primary Examiner* — Fikremariam A Yalew (57) ABSTRACT

The present disclosure generally pertains to systems and methods for protecting information for use by mobile devices. In one exemplary embodiment, a system comprises a mobile device, a base, and a memory device. The mobile device has a user input interface, and the base is secured to a user. The mobile device is configured to receive data manually input via the user input interface by the user and to wirelessly transmit the data. The mobile device is further configured to wirelessly transmit a retrieval request in response to a user input. The memory device is mounted on the base. The memory device is configured to receive and store the data wirelessly transmitted by the mobile device. The memory device is further configured to retrieve the data and to wirelessly transmit the data to the mobile device in response to the retrieval request.

17 Claims, 5 Drawing Sheets

SYSTEMS AND METHODS FOR PROTECTING INFORMATION USED BY MOBILE DEVICES

RELATED ART

Mobile devices, such as cellular telephones, lap-top computers, and personal digital assistants (PDAs), often store various types of data. For example, a user of a cellular telephone may input the telephone numbers of contacts, such as friends, relatives, or business associates, whom the user frequently calls. Such data is typically stored in the user's telephone so that a telephone number of desired contact can be automatically retrieved and used to establish a telephone call without the user having to later remember or input the telephone number.

However, if a mobile device is lost, stolen, or damaged, then the data previously entered into the device may be lost unless a backup copy is kept by the user. Unfortunately, maintaining a backup copy is somewhat burdensome, and many users enter data into mobile devices without storing backup copies of such data elsewhere. In some cases, the user can remember or otherwise acquire the lost information, but the process of re-entering the information into a new mobile device is burdensome. It would be desirable if the new mobile device could be automatically updated to store the lost information without the user having to manually input the data into the new mobile device.

In addition, the data stored in a lost or stolen mobile device may be confidential or sensitive such that the user would prefer that a third party could not access the data stored on the lost or stolen mobile device. To address these concerns, many mobile devices employ data security features, such as user authentication, in an effort to prevent unauthorized access of the data. However, these security features can often be defeated by a hacker in order to gain access to protected data. To address this issue, some mobile devices are designed to purge its data in response to a determination that it has been lost or stolen. For example, once the user discovers that his mobile device is missing, such user may communicate a wireless signal instructing the mobile device to purge its data. In some cases, the detection of a lost or stolen mobile device is automatic so that the purging may occur even before the user discovers that the mobile device is missing. However, accurately making such an automatic determination can be problematic. In addition, regardless of whether the lost or stolen determination is automatic, the data is vulnerable until the mobile device is able to determine that it has been lost or stolen.

Moreover, better techniques for protecting the data typically stored in mobile devices are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for protecting information used by mobile devices that process data, such as, for example, cellular telephones, lap-top computers, personal digital assistants (PDAs), and other like devices. In one embodiment of the present disclosure, data used by a mobile device is transmitted to an external memory device that is secured to an authorized user. The mobile device then purges such data in order to frustrate attempts by hackers to access the data in the event that the mobile device is lost or stolen.

While the mobile device is in the possession of the authorized user, the mobile device can retrieve the data stored in the external memory device. Thus, the authorized user can access the data stored in the external memory system, but an unauthorized user who steals or finds the mobile device likely cannot access the data stored in the memory device. Thus, the data is protected from unauthorized access in the event the mobile device is lost or stolen, yet the data is preserved for future use by the authorized user. In this regard, after losing the mobile device, the user may use a second mobile device to access the data stored in the external memory device. Therefore, it is unnecessary for the user to manually input the data into the second mobile device.

Figure 1:
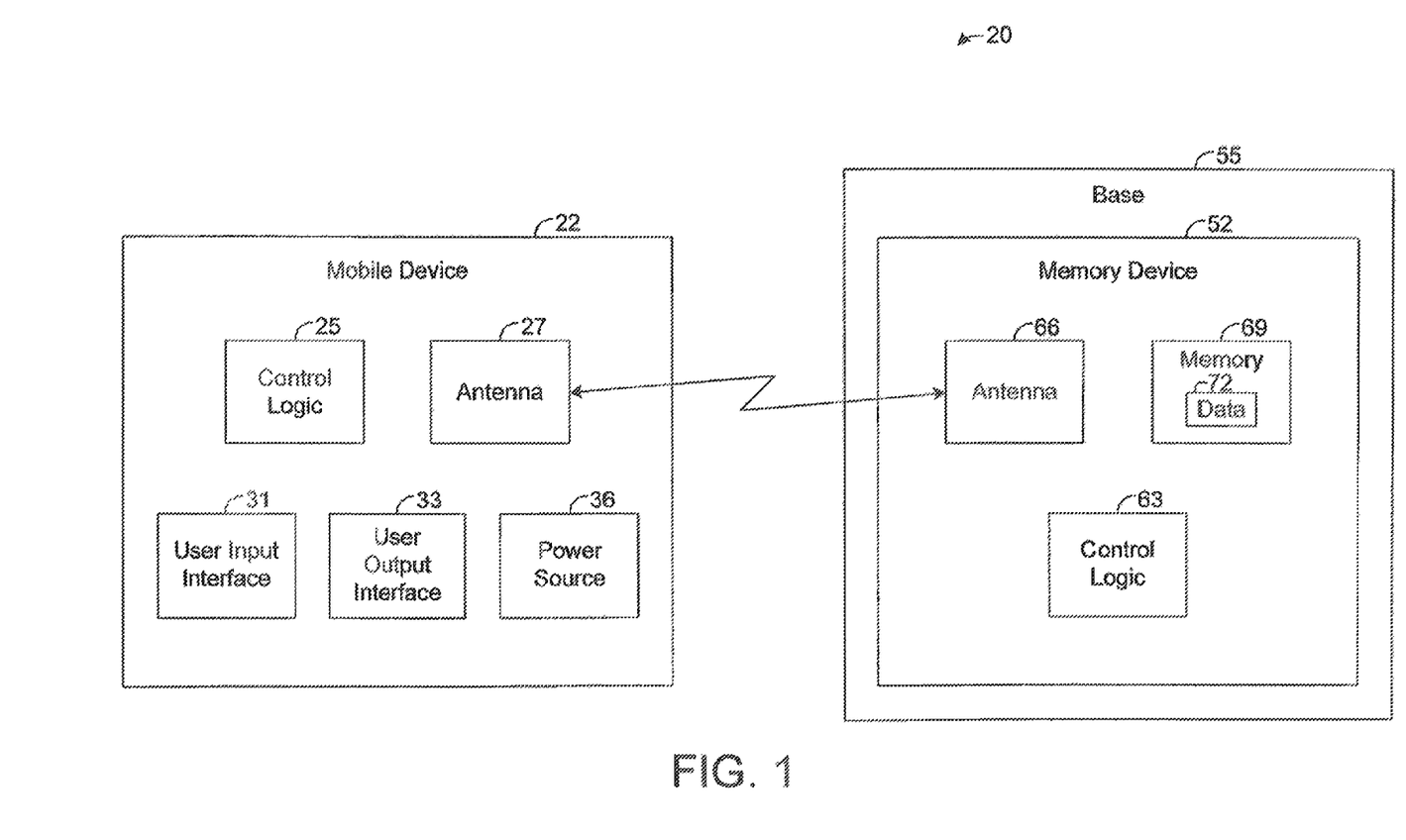
FIG. 1 is a block diagram illustrating an exemplary embodiment of a system for protecting information used by mobile devices.

FIG. 1 depicts an exemplary embodiment of a system 20 for protecting information used by mobile devices. As shown by FIG. 1, the system 20 comprises a mobile device 22, such as, for example, a cellular telephone, lap-top computer, or personal digital assistant (PDA). The mobile device 22 comprises control logic 25, an antenna 27, a user input interface 31, a user output interface 33, and a power source 36, such as a battery, which provides electrical power to the other components of the device 22. The control logic 25 is configured to process data in any desired manner, and such logic 25 is configured to communicate wirelessly with external devices via the antenna 27. For example, the control logic 25 may be configured communicate voice data and/or other types of data with a cellular base station (not shown) via the antenna 27. In another example, the control logic 25 may use the antenna 27 to communicate wirelessly with a WI-FI hot spot or some other external communication network device or system.

The user input interface 31 allows a user to input data. For example, the user input interface 31 may comprise a keyboard, keypad, microphone, and/or some other input device for enabling a user to input data. For example, if the mobile device 22 is implemented as a cellular telephone, the user input device 31 may comprise a microphone for receiving voice data that is communicated wirelessly via the antenna 27.

The user output interface 33 allows a user to receive data from the mobile device 22. For example, the user output interface 33 may comprise a display device, such as a liquid crystal display (LCD), for displaying data to the user and/or a speaker for playing audio messages to the user. For example, if the mobile device 22 is implemented as a cellular telephone, the user output device 31 may comprise a display device for displaying text messages and a speaker for playing voice data received via the antenna 27 or other types of audio data.

Figure 2:
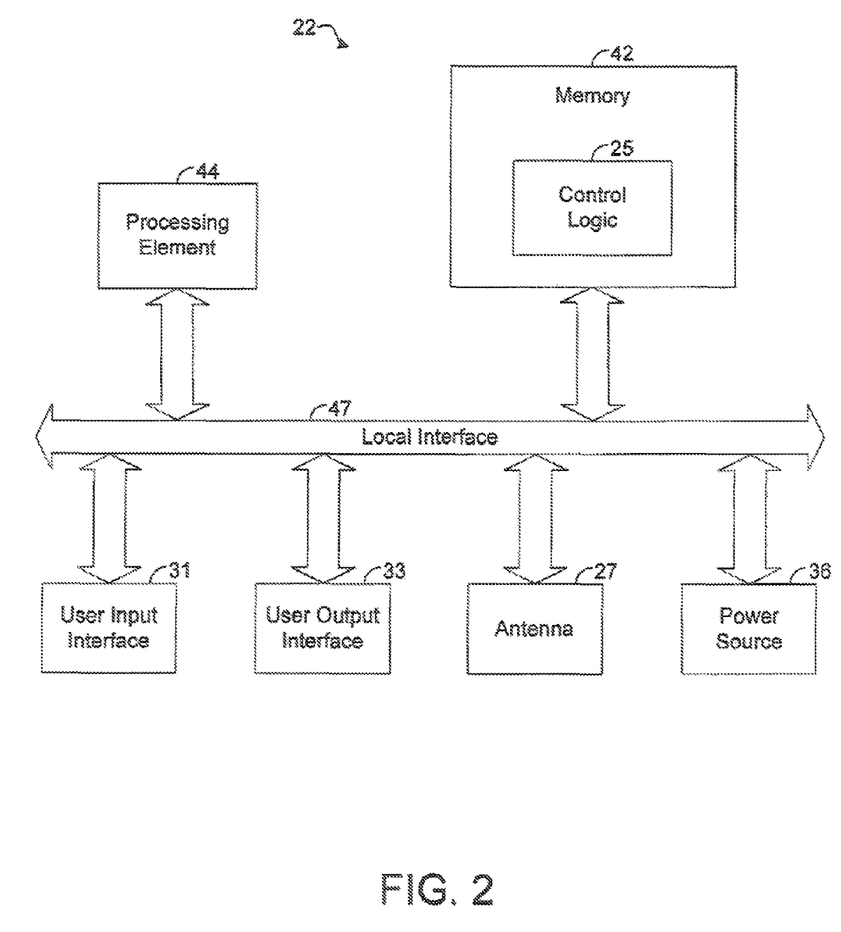
FIG. 2 is a block diagram illustrating an exemplary embodiment of a mobile device, such as is depicted by FIG. 1.

Note that the control logic 25 may be implemented in hardware, software, or a combination thereof. FIG. 2 depicts an exemplary embodiment in which the control logic 25 is implemented in software and stored in memory 42. When implemented in software, the control logic 25 can be stored and transported on any computer-readable medium for use by or in connection with an instruction execution apparatus that can fetch and execute instructions.

The exemplary embodiment depicted by FIG. 2 comprises at least one conventional processing element 44, such as a digital signal processor (DSP) or a central processing unit (CPU), that communicates to and drives the other elements within the device 22 via a local interface 47, which can include at least one bus. When at least a portion of the control logic 25 is implemented in software, the processing element 44 is configured to execute instructions of the logic 25.

As shown by FIG. 1, the system 20 also comprises a memory device 52 that is external to the mobile device 22. In the exemplary embodiment shown by FIG. 1, the memory device 52 is mounted on a base 55, which is secured to a user. For example, in one exemplary embodiment shown by FIG. 3, the base 55 comprises a finger ring 56 on which the memory device 52 is mounted. In other embodiments, the base 55 may comprise other types of jewelry, such as a watch, bracelet, or necklace, worn by the user or other types of objects worn or otherwise carried by the user. For example, the base 55 may comprise a keyring that is typically carried in and possibly attached to a pants pocket, purse, or other clothing item or personal accessory. In another example, base 55 comprises a pair of eyeglasses worn by the user. Various other types of objects may be used to implement the base 55 in other embodiments.

In one exemplary embodiment, the memory device 52 is implemented on a single integrated circuit (IC) chip in an effort to minimize the size of the device 52. Moreover, researchers at Hewlett-Packard (HP) Labs have demonstrated a memory chip, referred to as the "memory spot," which has a length and width of just a few millimeters. Such a chip could be used to implement the memory device 52. In other embodiments, other sizes of the memory device 52 and other numbers of IC chips are possible.

As shown by FIG. 1, the memory device 52 comprises control logic 63, an antenna 66, and memory 69, which is used to store data 72 transmitted from the mobile device 22, as will be described in more detail hereafter. If desired, the memory 52 may comprise a power source (not shown), such as a battery, to provide electrical power to the components of the device 52. In one exemplary embodiment, the memory device 52 uses electrical power from the signals received by the antenna 66 to power at least one component of the device 52.

Figure 4:
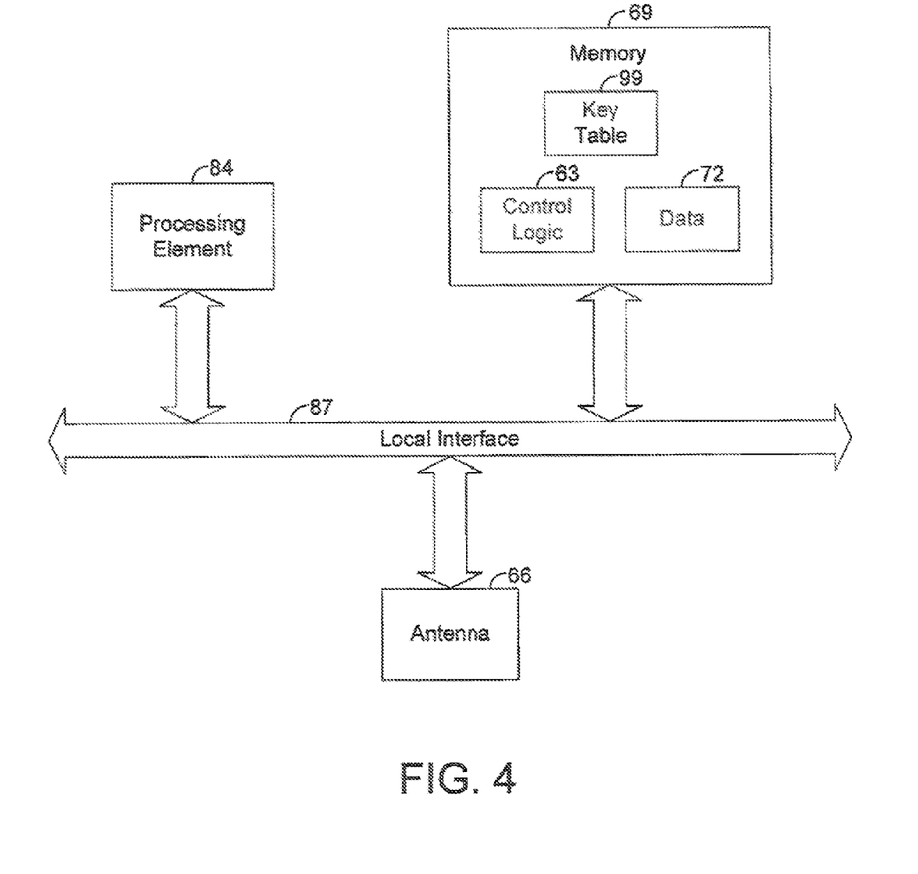
FIG. 4 is a block diagram illustrating an exemplary embodiment of a memory device, such as is depicted in FIG. 1.

The control logic 63 of the memory device 52 may be implemented in hardware, software, or a combination thereof. FIG. 4 depicts an exemplary embodiment in which the control logic 63 is implemented in software and stored in memory 69. When implemented in software, the control logic 63 can be stored and transported on any computer-readable medium for use by or in connection with an instruction execution apparatus that can fetch and execute instructions.

The exemplary embodiment depicted by FIG. 4 comprises at least one conventional processing element 84, such as a digital signal processor (DSP) or a central processing unit (CPU), that communicates to and drives the other elements within the device 52 via a local interface 87, which can include at least one bus. When at least a portion of the control logic 63 is implemented in software, the processing element 84 is configured to execute instructions of the logic 63.

During operation, the user may input, to the mobile device 22, data 72 that the user would like to have stored for later retrieval by the mobile device 22. For example, if the mobile device 22 is a cellular telephone, the user may input data 72 identifying various contacts and their respective telephone numbers. Such data 72 is used to call the identified contacts. For example, when the user desires to place a call to one of the contacts, the data 72 is retrieved, and the telephone number of the identified person is used to place a telephone call. Other types of data 72 may be input by the user in other examples. In addition, the data 72 may be input via the user input interface 31 or otherwise received by the device 22. For example, the data 72 may be downloaded from a network or remote communication device.

After the data 72 is input to the mobile device 22, the control logic 25 of the mobile device 22 communicates the data 72 to the memory device 52. In this regard, the data 72 is transmitted from antenna 27 to antenna 66. The control logic 63 of the memory device 52, upon receiving the data 72 from antenna 66, stores such data 72 in the memory 69 for later retrieval, as will be described in more detail hereafter. After the data 72 is transmitted to the memory device 52, the control logic 25 purges the data 72 from the mobile device 22. Therefore, if the mobile device 22 is lost or stolen, it does not contain the data 72 making it difficult for a third party to access the data 72 upon finding or taking the mobile device 22.

In this regard, the transmission range of the memory device 52 is preferably limited. In one exemplary embodiment, the transmission power for the signals transmitted by the antenna 66 is sufficiently small such that the range of such signals is less than a meter (e.g., a few centimeters). Further, since the base 55 is secured to (e.g., worn by or attached to) the user, the data 72 cannot be transmitted from the memory device 52 to the mobile device 22 unless the device 22 is close to the user, which is unlikely when the mobile device 22 is lost or stolen. More specifically, the data 72 cannot be transmitted from the memory device 52 to the mobile device 22 unless the mobile device 22 is within the transmission range of the memory device 52.

Figure 3:
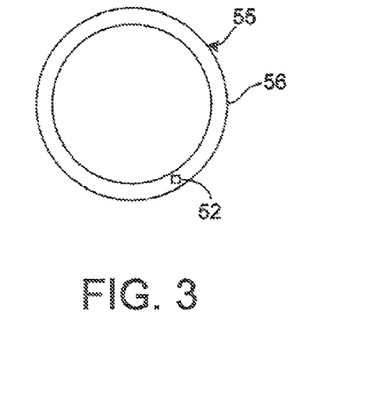
FIG. 3 depicts a memory device, such as is depicted in FIG. 1, mounted on a finger ring.

However, if the mobile device 22 is not lost or stolen, then it is likely that the mobile device 22 is within the transmission range of the memory device 52 when the user desires to access the data 72. In this regard, when the user attempts to access the data 72 via the mobile device 22, the user is likely holding such device 22, and the mobile device 22 is, therefore, likely less than a few feet from the memory device 52 secured to (e.g., worn by or attached to) the user. In some cases, such as when the memory device 52 is mounted on a finger ring 56, the mobile device 22 may be only a few centimeters from the memory device 52. Moreover, when access to the data 72 is desired, the control logic 25 of the mobile device 22 is configured to transmit, to the memory device 52, a retrieval request identifying the desired data 72. In this regard, the retrieval request is transmitted from antenna 27 to antenna 66. In response to the retrieval request, the control logic 63 of the memory device 52 is configured to retrieve the data 72 identified by the retrieval request and to transmit the retrieved data to the mobile device 22. In particular, the retrieved data 72 is transmitted by antenna 66 to antenna 27.

In one exemplary embodiment, radio frequency (RF) signals are used to communicate between the mobile device 22 and the memory device 52. However other types of signals may be used in other embodiments.

Upon receiving the retrieved data 72, the control logic 25 of the mobile device 22 uses the data 72 in a desired manner. After such use, the control logic 25 may transmit the data 72, along with any updates, back to the memory device 52 for storage. After the mobile device 22 uses the data 72, the data 72 is again purged from the device 22. However, if a copy of the data 72 remained in the external memory 69 and if the data 72 is not updated by the mobile device 22, there is no need to transmit the data 72 back to the memory device 52.

Accordingly, the data 72 is protected from unauthorized access in the event that the mobile device 22 is lost or stolen. Note that such protection is automatic. In this regard, the data 72 is automatically protected once the user walks far enough away from the mobile device 22 such that the device 22 is outside the transmission range of the memory device 52, yet the user can access the data 72 if the user later finds the mobile device 22. In this regard, upon finding and picking up the mobile device 22, the device 22 should again be within the transmission range of the memory device 52. Accordingly, it is unnecessary for the user to even discover that the mobile device 22 has been lost or stolen before the data 72 is protected from unauthorized access.

In addition, if the mobile device 22 is lost, stolen, or damaged, then the data 72 can be recovered even if the device 22 is never found or is permanently damaged. In this regard, the user may use another device to access the data 72. For example, the user may purchase or otherwise acquire a new mobile device to replace the one that was lost, stolen, or damaged. The new device may be configured to access the data 72 from the memory device 52 in the same or similar way that the lost, stolen, or damaged device 22 is configured to access the data 72. Thus, it is unnecessary for the user to re-enter the data 72 after losing or damaging the device 22 that was used to originally input the data 72. In this regard, the new device may access the data 72 as may be desired.

In some embodiments, the security of the data 72 is further enhanced via encryption. In this regard, before the data 72 is transmitted to the memory device 52, the control logic 25 of the mobile device 22 is configured to encrypt the data so that any third party intercepting the transmission of the data 72 between antennas 27, 66 or otherwise acquiring the data 72 is unable to effectively read it. In addition, the control logic 63 of the memory device 52 may store the data 72 in encrypted form in the memory 69. In one exemplary embodiment, the control logic 63 simply stores the received data 72 without decrypting it. Thus, if an unauthorized user steals or otherwise acquires the base 55 and memory device 52, the unauthorized user should be unable to extract any useful information from the memory 69.

When the encrypted data 72 is retrieved and transmitted to the mobile device 22, the control logic 25 of the device 22 is configured to decrypt the data 72 before using it. Note that various known or future-developed encryption techniques may be used to encrypt the data 72. In one exemplary embodiment, the memory device 52 is bound to many devices so that devices other than one that originally encrypted the data 72 can decrypt it. Therefore, if the mobile device 22 shown by FIG. 1 originally encrypts the data 72 but is later lost, stolen, or damaged, another device that has been previously bound to the memory device 52 can be used to decrypt the data 72 regardless of whether the lost, stolen, or damaged device 22 is ever found or repaired. However, other devices not bound to the memory device 52 cannot decrypt the data 72, or even communicate with the memory device 52. Exemplary techniques for encrypting and decrypting the data 72 will be described below.

For illustrative purposes, assume that a first device 22' (FIG. 5), referred to as the "root device," originally encrypts and stores data 72 to the memory device 52, but it is desirable for the memory device 52 to be bound to another device 22" so that this other device 22" can access the data 72 in the event that the root device 22' is lost, stolen, or damaged. Also assume that each mobile device 22', 22" has a respective public/private key pair. In this regard, assume that the root device 22' has a private key, referred to as "$key_{priv1}$," and a public key, referred to as "$key_{pub1}$." Also assume that the device 22" has a private key, referred to as "$key_{priv2}$," and a public key, referred to as "$key_{pub2}$."

Figure 5:
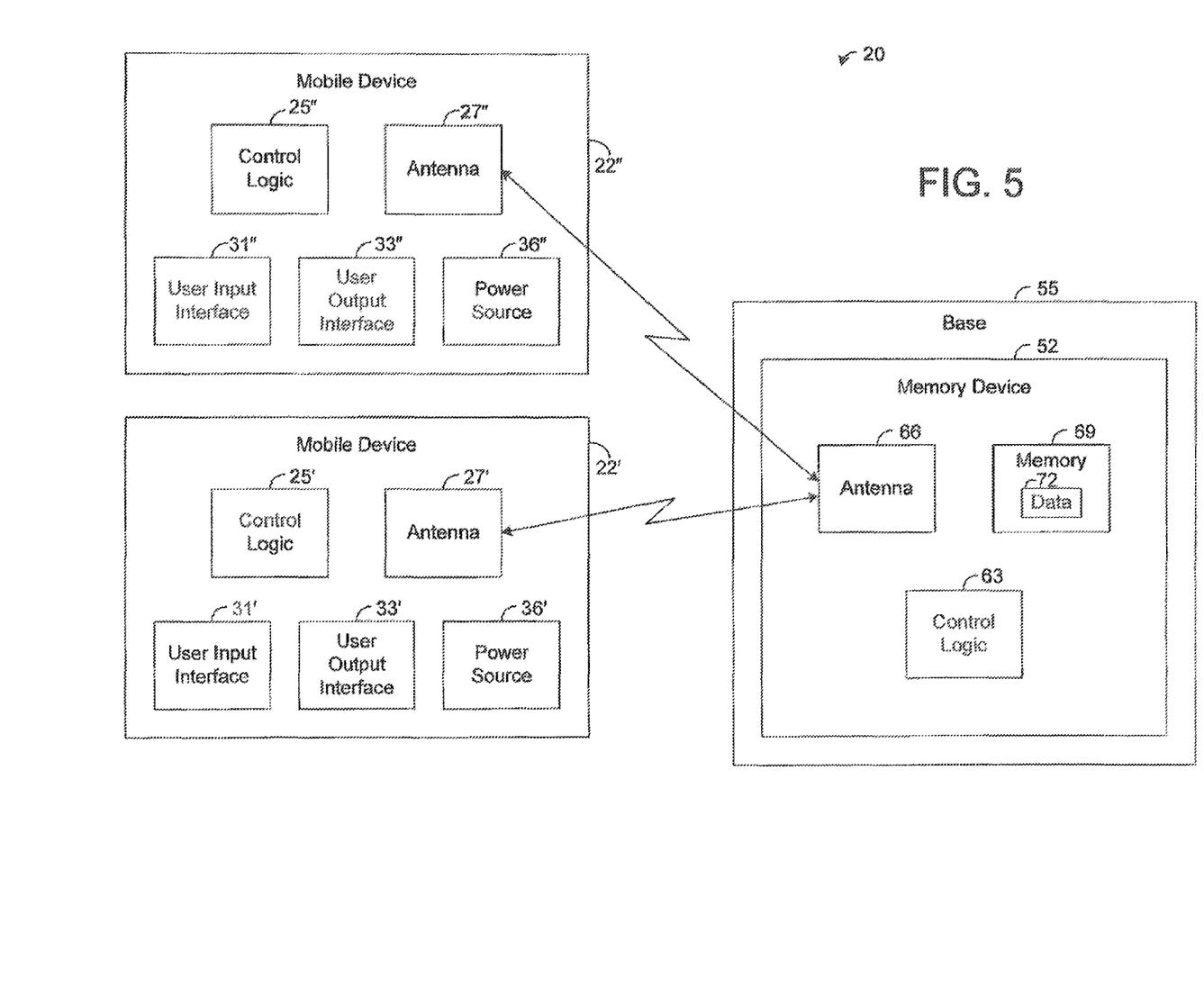
FIG. 5 is a block diagram illustrating an exemplary embodiment of a system for protecting information used by mobile devices.

To encrypt the data 72, the root device 22' generates a session key, referred to as "$key_{session}$." For example, the control logic 25' of the root device 22' may be configured to generate a random number and use the random number as $key_{session}$. The control logic 25' then encrypts the data 72 using $key_{session}$. Any known or future-developed encryption scheme, such as Rivest-Shamir-Adleman (RSA) or Advanced Encryption Standard (AES) encryption, may be used. The control logic 25' then transmits the encrypted data 72 to the memory device 52, which stores the encrypted data 72.

To bind device 22" to the stored data 72, the control logic 25' of the root device 22' obtains the public key, $key_{pub2}$, of the device 22" and an identifier of the device 22". In this regard, the device 22" may be configured to transmit such information to the root device 22'. The control logic 25' then encrypts $key_{session}$ using $key_{pub2}$ and transmits the encrypted session key, referred to as "$E(key_{session})$." The control logic 25' transmits the identifier of device 22" and $E(key_{session})$ to the memory device 52, and the control logic 63 of the memory device 52 stores the transmitted information in a table 99 (FIG. 4).

Later, if it is desired for the device 22" to access the data, such as when the root device 22' is lost or stolen, the device 22" retrieves the encrypted data 72 from the memory device 52. In this regard, the control logic 25" of the device 22" transmits a retrieval request via antennas 27", 66, and the control logic 63 of the memory device 52 retrieves the data 72 and transmits the retrieved data 72 to the device 22" via antennas 27', 66. The control logic 63 also transmits the table 99 to the device 22". The control logic 25" of the device 22" searches the table 99 for its identifier and the encrypted session key, i.e., $E(key_{session})$, associated with such identifier. The control logic 25" then uses its private key, $key_{priv2}$, to decrypt the encrypted session key, $E(key_{session})$. After recovering $key_{session}$, the control logic 25" uses $key_{session}$ to decrypt the data 72.

Note that the data 72 may be bound to many other devices according to the techniques described above. In this regard, for each bound device, the control logic 25' of the root device 22' encrypts $key_{session}$ with the public key of the device, and the encrypted session key is stored in the table 99. Thus, any of the bound devices can use the table 99 to recover the session key and then use the session key to decrypt the data 72.

Note that various data security techniques may be used to keep unauthorized users from accessing the data. For example, before the root device 22' binds another device to the data 72, the root device 22' may be configured to authenticate the other device via any known authentication algorithm. Various other security techniques may be employed in yet other examples.

Figure 6:
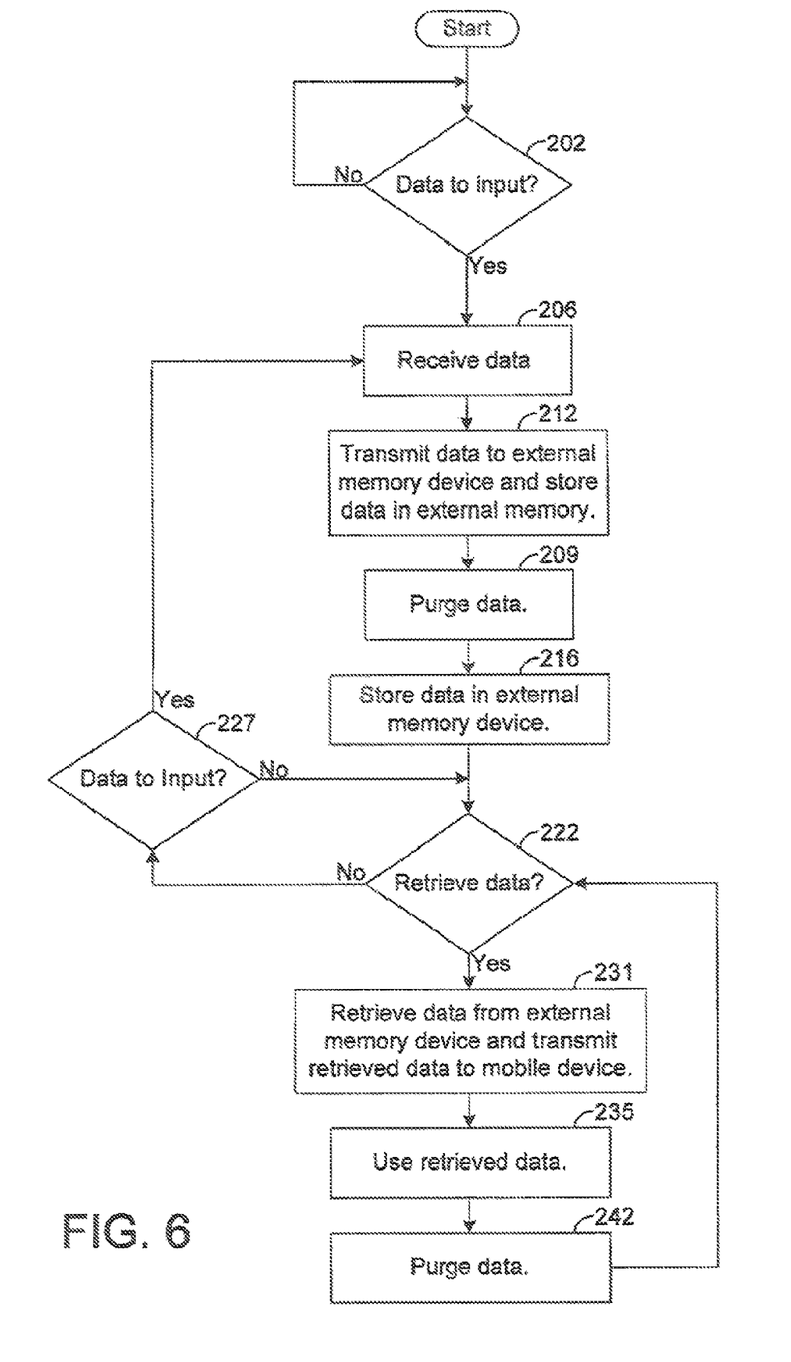
FIG. 6 is a flow chart illustrating an exemplary use of a system for protecting information used by mobile devices, such as is depicted by FIG. 1.

An exemplary use of the system 20 will now be described with particular reference to FIGS. 1 and 6.

For illustrative purposes assume that the mobile device 22 is a cellular telephone and that the data 72 defines a contact list. In this regard, the contact list includes a list of telephone numbers that can be retrieved to make telephone calls via the device 22. Assume that each telephone number is associated with an identifier of the person or entity that would likely receive a call using the associated telephone number. For example, the identifier may be the name of such person or entity.

Further assume that the user of the device 22 desires to add an entry to the contact list. In this regard, the user desires to update the contact list to add a telephone number for a contact so that the telephone number can be automatically retrieved to make a call to the contact at a later time. Initially, the user selects an option indicating that a new contact is to be added. Based on such input, the control logic 25 of the device 22 determines that data is to be input to the device 22, as shown by block 202 of FIG. 6. The user then inputs, via user input interface 31, data indicative of the contacts telephone number and an identifier, such as the name, of the contact. As shown by block 206, the control logic 25 receives such data and then wirelessly transmits the data to the memory device 52, which is external to the device 22. However, the memory device 52 is mounted on a base 55 that is usually carried by the user. For example, the base 55 may comprise a finger ring 56, as shown by FIG. 3, or other type of jewelry (e.g., a watch) that is typically worn by the user. In another example, the base 55 comprises a card, composed of plastic or some other material, that slides into a wallet of the user. In another example, the base 55 comprises a keyring that is typically carried in a pocket of clothes (e.g., pants) worn by the user. In other examples, the base 55 can comprise other types of devices.

Once the data is transmitted from the mobile device 22 to the memory device 52, the control logic 25 purges the data from the device 22, as shown by block 209. Upon receiving the data, the control logic 63 of the memory device 52 stores the data in the memory 69, as shown by block 216. In the instant example, the control logic 63 updates the contact list defined by the data 72 to add a new telephone number and identifier. Such identifier is associated with the telephone number in the data 72. For example, the contact list may be stored in a table with each entry in the table having a telephone number and the identifier associated with the telephone number.

In block 222, the control logic 25 of the mobile device 22 determines whether data is to be retrieved from the memory device 52. If no data is to be retrieved, then the control logic 25 determines whether more data (e.g., a new contact for the contact list) is to be input, as shown by block 227. If so, the process described above for inputting data and storing such data in the memory device 52 is repeated.

At some point, assume that the user desires to call a contact whose contact information is stored in the memory device 52. Thus, the user selects an option indicating that the user desires to access the contact list. In response, the control logic 25 of the mobile device 22 makes a "yes" determination in block 222 and transmits a retrieval request to the memory device 52. In response, the control logic 63 of the memory device 52 retrieves the contact list defined by the data 72 and wirelessly transmits the contact list to the mobile device 22, as shown by block 231. The control logic 25 of the mobile device 22 then uses the retrieved information, as shown by block 235. For example, the control logic 25 may display the contact list via the user output interface 33. Upon viewing the contact list, the user selects the identifier or telephone number of a person to be called. In response, the control logic 25 of the mobile device initiates a cellular telephone call based on the telephone number indicated by the data retrieved from the memory device 52. Upon using the contact list to make a call, the control logic 25 purges the contact list from the mobile device 22, as shown by block 242. Note that if the user updated the contact list before it is purged, the control logic 25 may transmit the update information to the memory device 52 so that the contact list in memory 69 can be updated as appropriate.

Since the data 72 that is input via the mobile device 22 is stored in the external memory device 52 and purged from the mobile device 22, the data 72 is protected against the risk of the mobile device 22 being lost or stolen. In this regard, the transmission range of the memory device 52 is limited (e.g., less than a meter). Thus, in the event that the mobile device 22 is lost or stolen, it is unlikely that the device 22 will be within the transmission range of the memory device 52. Therefore, it is unlikely that an unauthorized third party with access to the lost or stolen mobile device 22 can use such device 22 to access the data 72 stored in external memory 69. However, the original user of the device 22 can use another device to access the data 72 stored in external memory 69. For example, the user could buy a new cellular telephone to replace the one that was lost or stolen and use the new cellular telephone to access the data 72 in the same manner described above that the mobile device 22 accesses the data 72.

Note that purging of the data 72 from the mobile device 22 is unnecessary in all embodiments. Not purging the data 72 generally increases the risk that an unauthorized third party can use a lost or stolen mobile device 22 to access the data 72. However, in such embodiments, the memory device 52 essentially serves as a backup for the data stored in the mobile device 22. Thus, if the mobile device 22 is lost or stolen, the data 72 can be recovered from the memory device 52.

Now, therefore, the following is claimed:

1. A system for protecting information for use by mobile devices, comprising:
   a mobile device comprising a user input interface, the mobile device to receive contact data and to wirelessly transmit the contact data, the mobile device to automatically purge the contact data from the mobile device after wirelessly transmitting the contact data to a memory device and the mobile device to wirelessly transmit a retrieval request in response to a user input;
   a base securable to the user; and
   the memory device mounted on the base, the memory device to receive and store the contact data wirelessly transmitted by the mobile device, the memory device to retrieve the contact data and to wirelessly transmit the contact data to the mobile device in response to the retrieval request, the mobile device to display the contact data wirelessly transmitted to the mobile device.

2. The system of claim 1, the base comprising a finger ring.

3. The system of claim 1, the base comprising jewelry.

4. The system of claim 1, the contact data comprising at least one contact, the at least one contact comprising at least one telephone number.

5. The system of claim 1, the memory device to wirelessly transmit the data to the mobile device via a radio frequency (RF) signal.

6. The system of claim 1, the mobile device comprising a cellular telephone.

7. The system of claim 1, the mobile device to encrypt the contact data.

8. The system of claim 7, the mobile device to bind the memory device to a second mobile device.

9. A method for protecting information for use by mobile devices, comprising:
   providing a mobile device, the mobile device comprising a user input interface and a user output interface;

inputting contact data to the mobile device via the user input interface;
wirelessly transmitting the contact data from the mobile device to a memory device that is external to the mobile device;
automatically purging the contact data from the mobile device after the wirelessly transmitting the contact data from the mobile device to the memory device;
storing the data in the memory device;
securing the memory device to a user;
receiving an input from the user;
while the memory device is secured to the user, wirelessly transmitting the contact data from the memory device to the mobile device in response to the input; and
displaying, via the user output interface, the contact data wirelessly transmitted from the memory device to the mobile device.

10. The method of claim 9, the input received via the user input interface.

11. The method of claim 9, the memory device mounted on a finger ring.

12. The method of claim 9, the memory device mounted on jewelry.

13. The method of claim 9, the securing comprising inserting the memory device into a pocket of clothes worn by the user.

14. The method of claim 9, the wirelessly transmitting the contact data from the memory device to the mobile device comprising transmitting the contact data via a radio frequency (RF) signal.

15. The method of claim 9, the mobile device comprising a cellular telephone.

16. The method of claim 9, further comprising encrypting the data.

17. The method of claim 16, further comprising binding the memory device to a second mobile device.

* * * * *